No. 775,917. PATENTED NOV. 29, 1904.
G. H. GILLETTE.
SEAL FOR BOTTLES, &c.
APPLICATION FILED JUNE 26, 1901.
NO MODEL.

WITNESSES:
Fred White
Thomas F. Wallace

INVENTOR:
George H. Gillette,
By Attorneys,
Arthur E. Fraser & Co.

No. 775,917. Patented November 29, 1904.

UNITED STATES PATENT OFFICE.

GEORGE H. GILLETTE, OF NEW YORK, N. Y., ASSIGNOR TO THE CROWN CORK AND SEAL CO. OF BALTIMORE CITY, OF BALTIMORE, MARYLAND, A CORPORATION OF MARYLAND.

SEAL FOR BOTTLES, &c.

SPECIFICATION forming part of Letters Patent No. 775,917, dated November 29, 1904.

Application filed June 26, 1901. Serial No. 66,173. (No model.)

*To all whom it may concern:*

Be it known that I, GEORGE H. GILLETTE, a citizen of the United States, residing in the borough of Manhattan, city, county, and State of New York, have invented certain new and useful Improvements in Seals for Bottles, &c., of which the following is a specification.

My invention aims to provide a new and improved means for sealing bottles which shall be reliable and cheap and capable of ready application and removal.

My invention aims to provide also an improvement in seals whereby they are adapted to be used on bottles of various shapes at present in use and whereby the seal is made more permanent and reliable than seals of the same class now on the market.

My invention aims to provide also improvements in seals having several other points of advantage, referred to in detail hereinafter.

Figure 1:
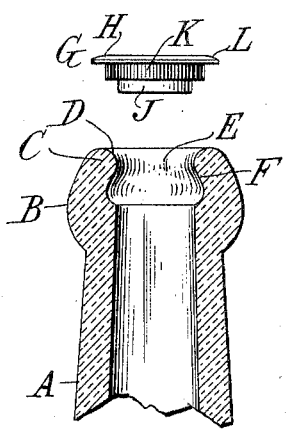
Figure 2:
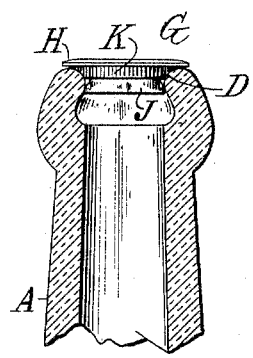
Figure 3:
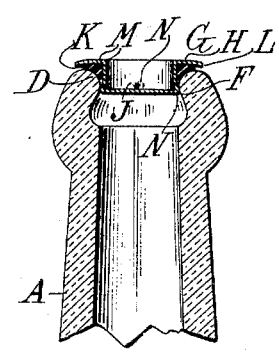
Figure 4:
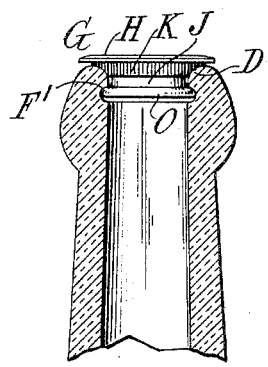
Figure 6:
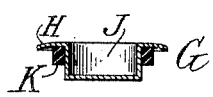
Figure 5:
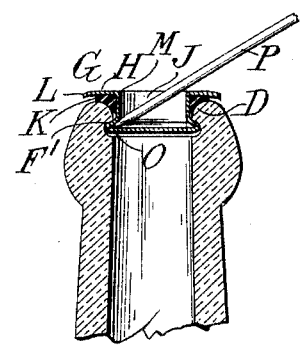
Figure 7:
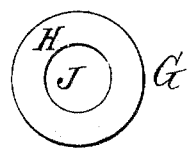
Figure 10:
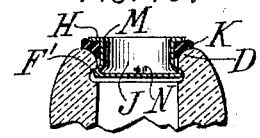
Figure 9:
Figure 8:
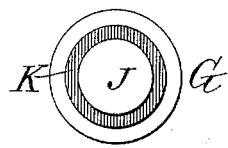

Referring to the accompanying drawings, which represent certain embodiments of my invention, Figure 1 is a side elevation of an improved seal made according to my invention in juxtaposition to a sectional view of the upper half of the neck of a bottle for which it is adapted. Fig. 2 is a view of the same parts with the seal in operative position. Fig. 3 is a view of the same parts, showing the seal in section. Fig. 4 is a view similar to Fig. 2 of a modification, especially in the mode of attaching the same to the bottle. Fig. 5 is a view similar to Fig. 3 of the same modification. Figs. 6, 7, and 8 are a section and top and bottom plan, respectively, of a seal embodying my invention. Fig. 9 is an elevation of a slightly-modified form of seal. Fig. 10 is a sectional view of the same in use.

Various means of sealing bottles are in use in which plates or caps of comparatively soft sheet metal are provided extending over the mouth of the bottle and pressed down and fastened under a shoulder either on the exterior of the head of the bottle or on the interior of the same, some sort of yielding material, such as cork, being provided to fill the space between the cap or plate and the bottle to make a tight closure. For use with such seals it is common to provide bottles with shoulders, either externally or internally, or both, near the mouth for fastening of the seal. My invention is especially adapted for use with bottles of that sort, though the new principle of the invention may be applied to any other suitable form of bottle. The seal itself may also be constructed in various ways. According to the preferred embodiment a cap of soft sheet metal or like material is provided which has a laterally-projecting rim or flange adapted to extend over the mouth or opening of the bottle and partially over the lip thereof, so as to press down on the inner corner of the lip a ring of packing material. The packing is preferably a ring of any suitable material, such as rubber, cork, or the like. This ring is held in position on the cap by means of a downward projection on the cap, around which the ring fits closely. The ring has also, preferably, an outer diameter greater than the diameter of the mouth or opening, whereby when the seal is pressed in place the packing can only enter the mouth under compression, and thereby forms a most effective seal. The ring may be held on the projection either by reason of its close fit, the ring being stretched over the same, or by any other suitable means. In use the projection enters the mouth of the bottle, and upon the cap's being pressed down the packing-ring is forced up under pressure in the space between the inner corner of the lip of the bottle and the corner which is formed by the rim and the projection. By reason of this construction the packing receives the direct pressure of the bottle-closing apparatus and is not utilized to hold the seal in place, so that if it deteriorates in the course of a long time the seal is still held in place, other means being used for this purpose.

For holding the cap in place I preferably provide means by which a part of the cap may be bent under a shoulder on the head of the bottle at any point to which the cap may be pressed down, so as to prevent any upward movement, the bending being effected while the plate is held down and the packing-ring is under compression. The holding means is preferably a portion of the plate extending inside of the bottle-mouth, so as to take under an internal shoulder. The latter specific form is shown in my present application, in which the central projection which holds the packing-ring serves also as a locking means for holding the seal down.

Referring to the drawings, A represents the neck of a bottle; B, the head; C, the lip having an inner corner D, preferably rounded, as shown, E being the mouth, immediately below which is formed a shoulder F. This is a form of bottle now in use with seals of the same general nature as mine. G is an improved seal made according to my invention and composed, preferably, of a sheet-metal cap having a rim H adapted to extend over the mouth E, a downward projection J at the center, and a ring K, of packing material—such as rubber, cork, or the like—surrounding the projection J. The projection J is preferably formed by stamping it down from the cap, which may also be curved downward at the outer edge L of its rim in order to better hold the ring in the angle of the cap and also to prevent accidental displacement of the seal, which might occur if the rim projected directly outward across the mouth of the sealed bottle. This construction also insures that when pressure is applied, as hereinafter described, the yielding packing-ring shall be pressed inward, so as to prevent its spreading out on the upper edge of the lip of the bottle. The ring may conveniently be held on the projection J by merely stretching around the same, though any other suitable means may be employed to hold it in place before the seal is put in use.

The projection J is preferably made so large as to substantially fit and nearly fill the mouth of the bottle—a feature which assists in locating the seal centrally of the mouth when it is being put into use. This feature may be of use with other seals than the particular ones herein shown. In the particular combination shown the making of the projection to nearly fit the mouth of the bottle serves the additional purpose of preventing the packing-ring K from entering the mouth of the bottle except when it is put under pressure. Since the ring has its inner diameter less than or equal to that of the bottle-mouth and its outer diameter greater than that of the bottle-mouth, it cannot enter the mouth except when the pressure is applied, and it will at the same time spread laterally, as shown in Fig. 3, and then will be compressed in the angle of the cap.

The preferred mode of applying my improved seal to a bottle is illustrated in Figs. 2 and 3. The seal being placed on the head of the bottle and being automatically centrally located by means of the central projection J, it is pressed and held down with considerable pressure, so that the packing-ring K is squeezed between the corner D of the lip and the corner M of the cap and spreads slightly under compression downward toward the mouth of the bottle and outward toward the outer edge of the lip. In this position the lower edge of the projection J extends slightly below the mouth of the bottle. An expanding-tool of any suitable kind is then applied to the side portion of the projection J, preferably at its lower edge, so as to expand the same and cause it to catch under the shoulder F, and thereby hold the seal G down in position with the packing compressed. The expanding-tool may expand the projection J at several separated points, so as to form locking portions N to hold the seal in place. As these locking portions N are not in themselves seals, but merely locks to hold the packing-ring K in a compressed state in its position between the plate and the lip of the bottle, they do not need to be continuous. It is only necessary to provide a sufficient number of them to hold the seal permanently in position against the internal pressure which may exist in the bottle.

Instead of bending out the projections N, as by pinching them outward at separate points, a continuous rib O may be formed for the same purpose, Figs. 4 and 5, as by spinning out the material or in any other suitable way. In these figures also I show a modification of the bottle of Fig. 1, which is especially adapted for use with the form of seal shown. The shoulder F' in this case is made somewhat more abrupt, so that it gives a rather better hold to the locking projection of the seal.

As far as the actual sealing of the bottle is concerned it is obviously only necessary to provide a cap having a rim H of sufficient size to extend slightly over the lip of the bottle, so as to engage the packing-ring between such lip and the plate, as shown in Figs. 9 and 10, whereby the downward pressure on the plate serves to compress the packing-ring in its position. In this case the outer projecting portion L of the rim H is omitted, and only so much is provided as is useful in the actual formation of the seal. It is to be observed also that in so far as the generic features of my invention are concerned the rim H is not necessarily a part of and integral with the projection J except where, as in the examples shown, the projection J is depended upon to attach the cap to the locking means.

Any suitable arrangement for facilitating the removal of my seal may be provided without affecting the sealing means. The outer edge of the rim H, for example, may be arranged for being grasped by a lever, as in the forms of cap now in general use, or no special provision for this may be made, the seals being easily removed by means of a lever, such as P, Fig. 5, whose end takes into the internal corner of the projection J and which bears at an intermediate point on the upper shoulder of the same. Any suitable metal may be used for the cap, preferably such as is sufficiently ductile to permit of its being pressed into the shape shown and bent under the shoulder on the head of the bottle without difficulty, and yet with sufficient firmness. The material of my packing-ring may also be varied within considerable limits, it being necessary both to provide material which under the pressure used will yield sufficiently to form a perfectly tight packing between the metal and the glass and which will have sufficient life under the pressure and exposure to liquids to which it may be subjected to last a reasonable time.

It will be seen that my invention provides a stopper which is cheap and simple of construction, easy of application and removal, and which constitutes an efficient and durable seal. Its capability of perfectly sealing the bottle is not affected by ordinary irregularities in the shape of the mouth of the bottle, since the only parts which need to fit the shape exactly are the parts of the yielding packing-ring, which are pressed so strongly into contact with the bottle that they readily adapt themselves to irregularities in shape met with in practice.

It will be understood that the invention is not limited to the particular details of construction and arrangement set forth in the foregoing specification, since it can be employed in whole or in part, according to such modifications as circumstances or the judgment of those skilled in the art may dictate, without departing from the spirit of my invention. It will be understood also that the specific seals shown in this and in my companion application above referred to are shown as mere examples embodying my generic invention.

What I claim is—

1. The combination with a bottle having an annular shoulder near its mouth, of a cap having an overlying portion adapted to extend over the lip of said bottle and having a central projection adapted to enter the mouth of said bottle, and a packing-ring surrounding said projection, the inner diameter of said ring being equal to or less, and its outer diameter greater, than the diameter of said mouth whereby the packing can enter the mouth of the bottle only under compression, whereby said ring is adapted when the bottle is sealed to lie in the space between the inner corner of the lip of the bottle and the corner formed by said overlying portion and said projection, said cap being of soft sheet metal whereby it may be bent under and in direct unyielding contact with said shoulder at any point to which the cap may be pressed down.

2. The combination with a bottle provided with a lip having its inner corner adjacent to the mouth of the bottle and having an annular shoulder near its mouth, of a sheet-metal cap having an overlying portion adapted to extend over the lip of said bottle, said cap having a central projection adapted to enter the mouth of the bottle, and a packing-ring surrounding said projection adapted when the bottle is sealed to lie in the space between the inner corner of the lip of the bottle and the corner formed by said overlying portion and said projection and a part of said cap adapted to be locked under and in direct unyielding contact with said shoulder at any point to which the cap may be pressed down.

3. The combination with a bottle provided with a lip having its inner corner adjacent to the mouth of the bottle, and having an annular shoulder near its mouth, of a sheet-metal cap having an overlying portion extending over said lip, a central projection entering the mouth of said bottle, and a packing-ring surrounding said projection and lying in the space between the inner corner of the lip of the bottle and the corner formed by said overlying portion and said projection, said packing-ring being held under compression by said overlying portion and projection to seal the bottle, a part of said cap being bent under and in direct unyielding contact with said shoulder to lock said cap in place.

4. The combination with a bottle provided with a lip having its inner corner adjacent to the mouth of the bottle, and having an internal annular shoulder near its mouth, of a sheet-metal cap G having a rim H extending over said lip, a central projection J on said cap entering the mouth of said bottle, the lower portion of said projection J being bent under and in direct unyielding contact with said shoulder to lock said cap in place, and a packing-ring K surrounding said projection and lying in the space between the inner corner of the lip of the bottle and the corner of the cap formed by said rim and said projection, said rim and projection holding said packing-ring under compression to seal the bottle.

5. The combination with a bottle provided with a lip having its inner corner adjacent to the mouth of the bottle, and having an internal annular shoulder near its mouth, of a sheet-metal cap G having a rim H extending over said lip, a central projection J on said cap entering the mouth of said bottle and bent outward at its lower part at separate points to form locking projections N which engage under and in direct unyielding contact with said shoulder, and a packing-ring K surrounding said projection and lying in the space between the inner corner of the lip of the bottle and the corner of the plate formed by said rim and said projection, said rim and projection holding said packing-ring under compression to seal the bottle.

In witness whereof I have hereunto signed my name in the presence of two subscribing witnesses.

GEORGE H. GILLETTE.

Witnesses:
 DOMINGO A. USINA,
 FRED WHITE.